(No Model.)
H. D. OVERTON.
THILL COUPLING.
No. 333,969. Patented Jan. 5, 1886.
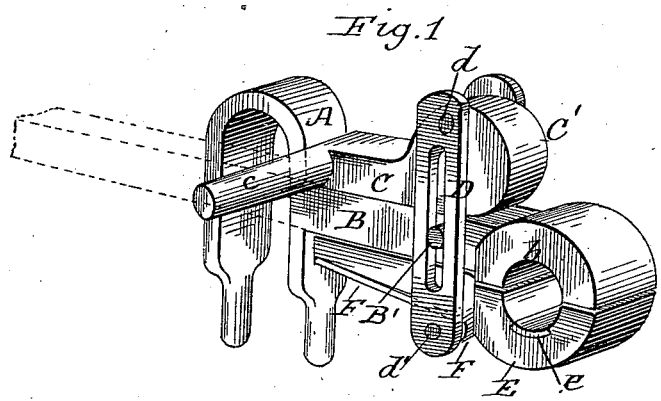
Fig. 1
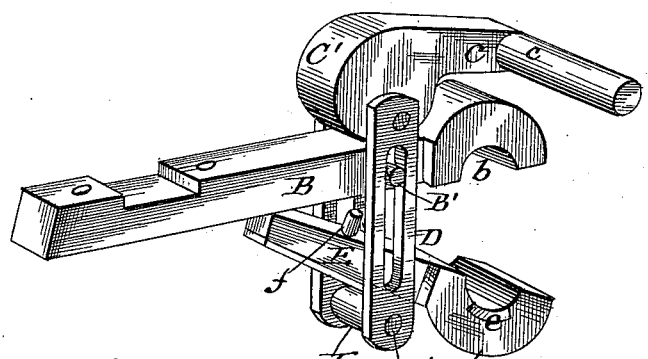
Fig. 2
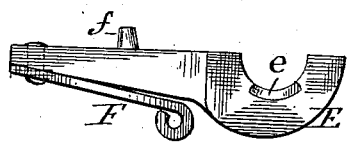
Fig. 3.
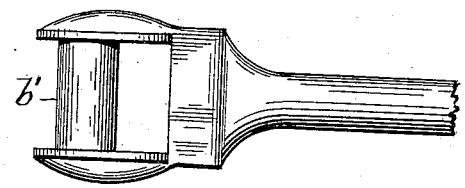
Fig. 4
Witnesses:
Inventor:
Attorney.

UNITED STATES PATENT OFFICE.

HARMON D. OVERTON, OF MISSOURI VALLEY, IOWA.

THILL-COUPLING.

SPECIFICATION forming part of Letters Patent No. 333,969, dated January 5, 1886.

Application filed December 31, 1883. Renewed October 15, 1885. Serial No. 180,001. (No model.)

*To all whom it may concern:*

Be it known that I, HARMON D. OVERTON, a citizen of the United States of America, residing at Missouri Valley, in the county of Harrison and State of Iowa, have invented certain new and useful Improvements in Thill-Couplings; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in thill-couplings, the object of my invention being to provide a cheap and convenient method for coupling the shafts or pole to wagons or other vehicles, so that the same may be coupled or uncoupled readily; and my invention consists more especially in the construction and combination of the parts, as will be hereinafter set forth, and pointed out in the claims.

In the accompanying drawings, which illustrate my invention, Figure 1 is a perspective view showing the jaws closed so as to embrace the thill-irons. Fig. 2 is a perspective view showing the jaws open. Fig. 3 is a detailed view, and Fig. 4 is a top view, of the shaft-iron.

In the accompanying drawings, A represents an axle-clip, which may be rigidly attached to the bar B, which forms the upper half of the coupling, and is provided near its end with a semicircular opening, $b$.

In the drawings I have shown two ways in which the coupling may be constructed so as to be attached to the axle, in Fig. 1 the clip being formed integral with the bar B, and, as shown in Fig. 2, the bar B is provided with perforations for the reception of the clip.

Outwardly-projecting lugs B' are formed at a suitable point on the sides of the bar B. The lugs B' may consist of projections formed in the bar B, or these lugs may be provided by passing a bar through a perforation, which bar will project beyond its edges, as shown.

To one side or on top of the bar B, which is rigidly connected to the shaft or axle of the vehicle, is secured a cam-lever, C, the cam being indicated by the letter C', which cam has a flat rearwardly-projecting portion, the end of which is bent at right angles, as shown at $c$, so as to provide an operating-handle. At a suitable point upon this cam are secured, by means of pivots $d$, slotted links D, which embrace the sides of the cam and pass over the bar B, the projecting lugs upon said bar lying within the slots. The lower portions of these links are connected to each other by a transverse bolt, $d'$, which bolt is embraced by the coiled end of a spring, F, which spring is attached by means of a suitable rivet to the lower portion of the clip E. This lower portion of the clip has a straight upper edge, and is provided with a semicircular recess, which has formed at its lower edge a transverse wedge-shaped slot, in which is placed a rubber cushion, $e$. On the straight upper surface of the lower portion of the clip is provided an upwardly-projecting lug, $f$, which will fit into a corresponding recess formed in the bar B.

By the construction hereinbefore described, and fully illustrated in the accompanying drawings, it will be noticed that all the parts of my improved clip are attached to each other in such a manner that they cannot become separated, but so as to allow the parts to be tightened upon each other or readily opened.

The bar $b'$, which is embraced between the jaws B and E, may be formed of substantially a single piece of metal, the lower end being bifurcated, so as to support within the arms a transverse bar, $b'$, as shown. By this construction there will be no parts which are not rigidly attached to each other, and rattling will be prevented, as well as a simple and strong connection provided.

The spring F, which is attached to one end of the lower jaw or bar, E, has a tendency or exerts a pressure downward or away from this jaw.

Having thus described the construction of my invention, so as to be fully understood by those skilled in the art, I will now proceed to describe the manner in which it may be operated. The jaws being opened and the lever in the position shown in Fig. 2 of the accompanying drawings, the transverse bar $b'$ is placed within the semicircular opening $e$, and the eccentric or cam lever is turned toward the axle, which will raise the lower jaw and hold the same securely against the upper jaw, the force being imparted through the slotted links D, which will bring the parts in the position shown in Fig. 1.

The spring F is sufficient to take up the wear of the parts and secure at all times a close connection, and the rubber will prevent rattling of the connecting-bolt within the jaws.

Having thus described my invention, what I claim as new, and desire to secure by Letters Patent, is—

1. In a thill-coupling, the stationary jaw B, provided with outwardly-projecting lugs B', and a lower or movable jaw, E, having attached thereto slotted links D, and a cam-lever connected to said links and bearing upon the stationary jaw, substantially as shown, and for the purpose set forth.

2. In a thill-coupling, the stationary jaw B, having projecting lugs B', and slotted links D, embracing said lugs and connected at one end to a cam-lever and at the other end to a spring, which is rigidly attached to a lower jaw, the parts being combined and organized substantially as shown, and for the purpose set forth.

3. In a thill-coupling, the stationary jaw B, rigidly attached to a supporting means, and provided with a flat under surface having a recess formed therein, the slotted links D, connected at their upper ends to a cam or eccentric provided with an outwardly-projecting operating-handle, the lower jaw having a plain upper surface, with a projecting lug, $f$, and a spring, F, embracing the transverse bar $d'$ of the links, the parts being organized and combined for the purpose set forth.

In testimony whereof I affix my signature in presence of two witnesses.

HARMON D. OVERTON.

Witnesses:
A. B. M. ELLIS,
R. H. HARRIS.